United States Patent

Jones

[15] 3,698,364
[45] Oct. 17, 1972

[54] FUEL COMBUSTION SYSTEM FOR ROTARY PISTON INTERNAL COMBUSTION ENGINES

[72] Inventor: Charles Jones, Hillsdale, N.J.

[73] Assignee: Curtiss-Wright Corporation

[22] Filed: Feb. 26, 1971

[21] Appl. No.: 119,131

[52] U.S. Cl..............123/8.09, 123/30 B, 123/32 F, 123/32 JV, 418/61
[51] Int. Cl..............................................F02b 53/10
[58] Field of Search.........123/8.09, 8.11, 30 B, 32 F, 123/32 JV; 418/61

[56] References Cited

UNITED STATES PATENTS

| 3,246,636 | 4/1966 | Bentele.....................123/8.09 |
| 3,213,836 | 10/1965 | Keylwert et al............123/8.11 |
| 3,606,602 | 9/1971 | Hamada et al...............418/61 |
| 1,834,061 | 12/1931 | Joachim.....................123/32 J |

FOREIGN PATENTS OR APPLICATIONS

| 999,561 | 7/1965 | Great Britain............123/8.11 |

Primary Examiner—C. J. Husar
Attorney—Arthur Frederick and Victor D. Behn

[57] ABSTRACT

The fuel combustion system for a rotary piston, internal combustion engine having an unthrottled air intake port provides two sets of fuel burning means, each set comprising a fuel injector nozzle and spark plug combination supported in the engine housing in spaced relationship with the other set along a line parallel to the axis of rotor rotation. Each fuel injection nozzle is constructed and arranged to emit a plurality of fuel streams in different planes and directions into the working chambers of the engine. The fuel injection nozzles are each disposed relative to each other and with respect to the rotor direction of rotation to emit at least one of the streams of fuel in the same general direction as the direction of rotor rotation and the other fuel streams toward the adjacent set of injector nozzle and spark plug. This pattern of fuel emission provides the requisite distribution of fuel in the working chambers for achieving a proper stoichiometric mixture of fuel and air for improved combustion efficiency.

10 Claims, 8 Drawing Figures

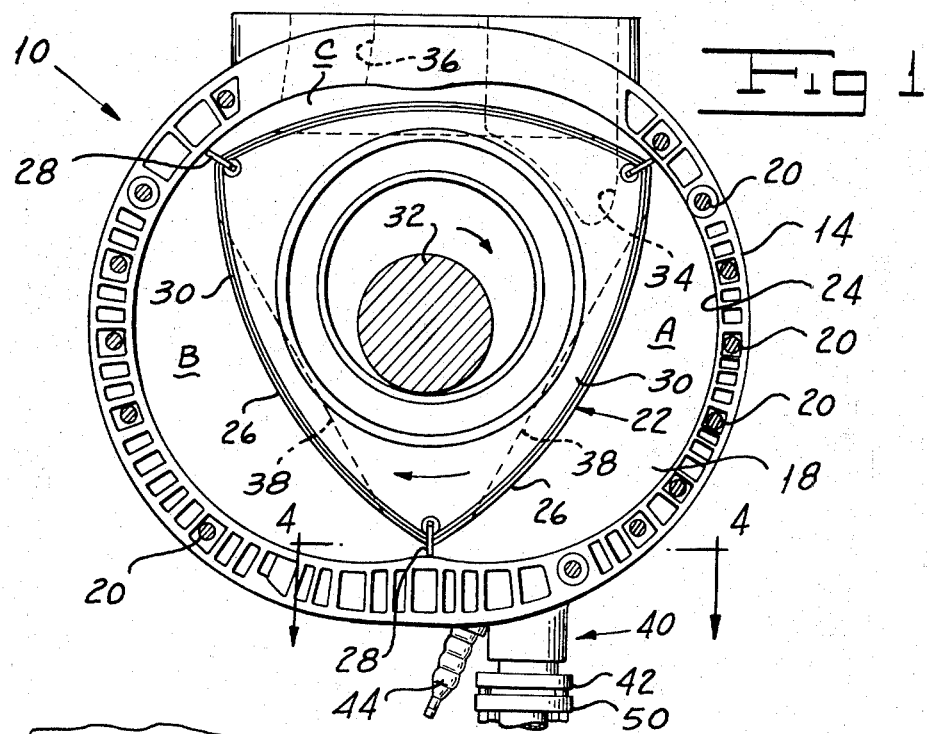
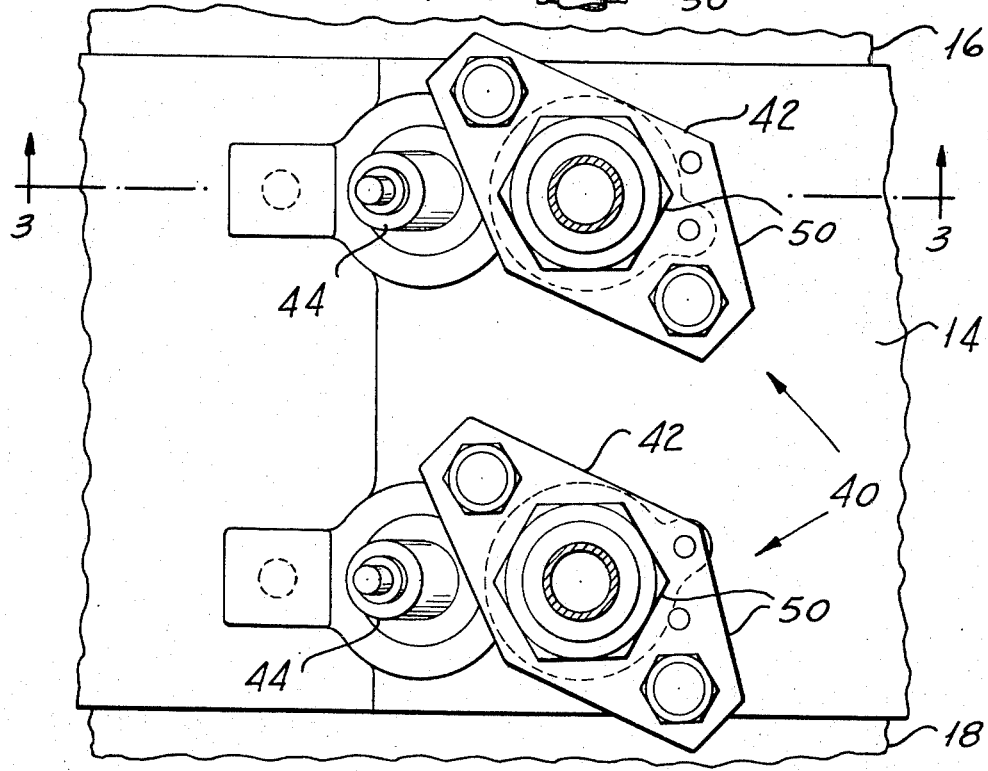

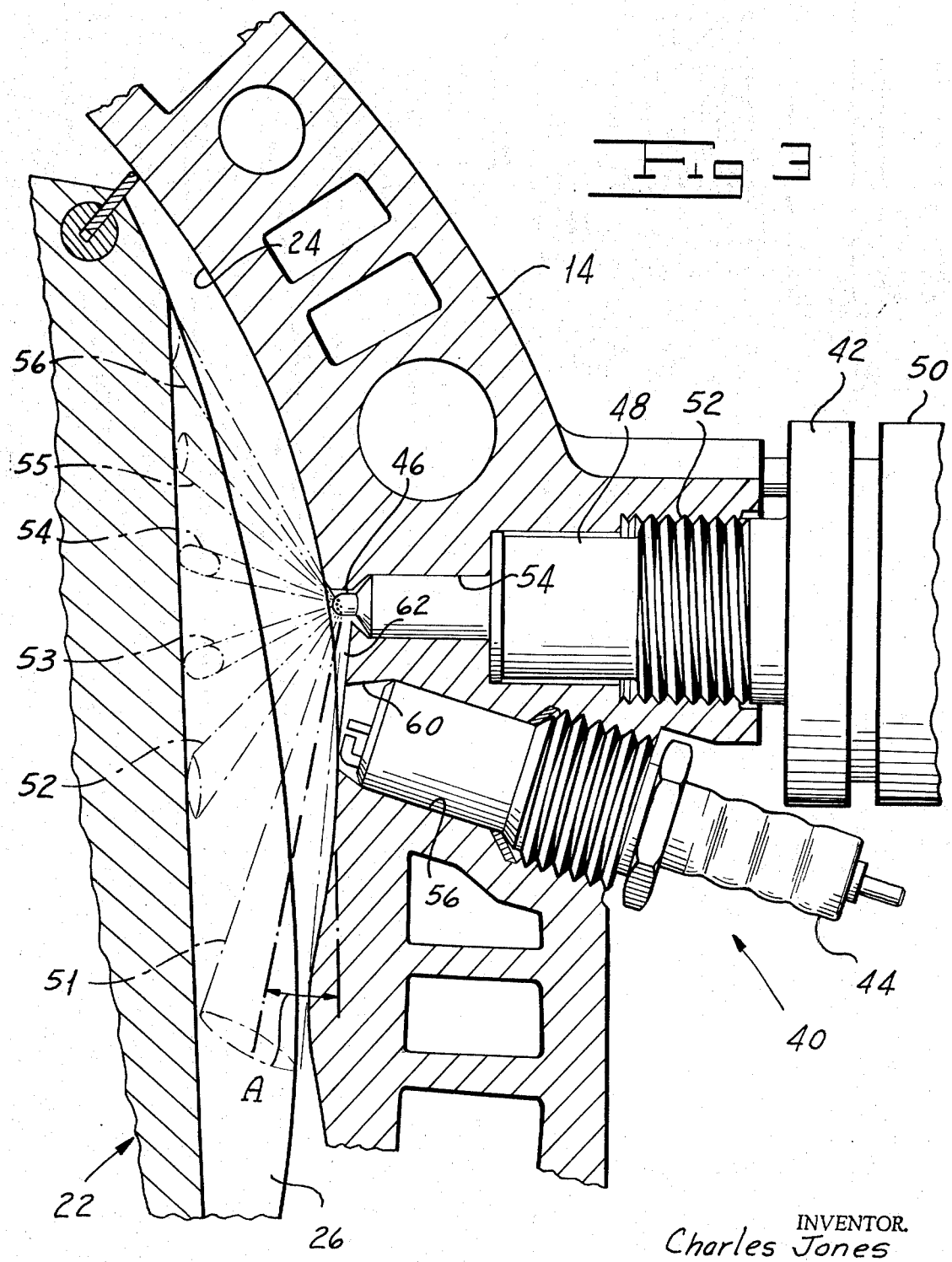

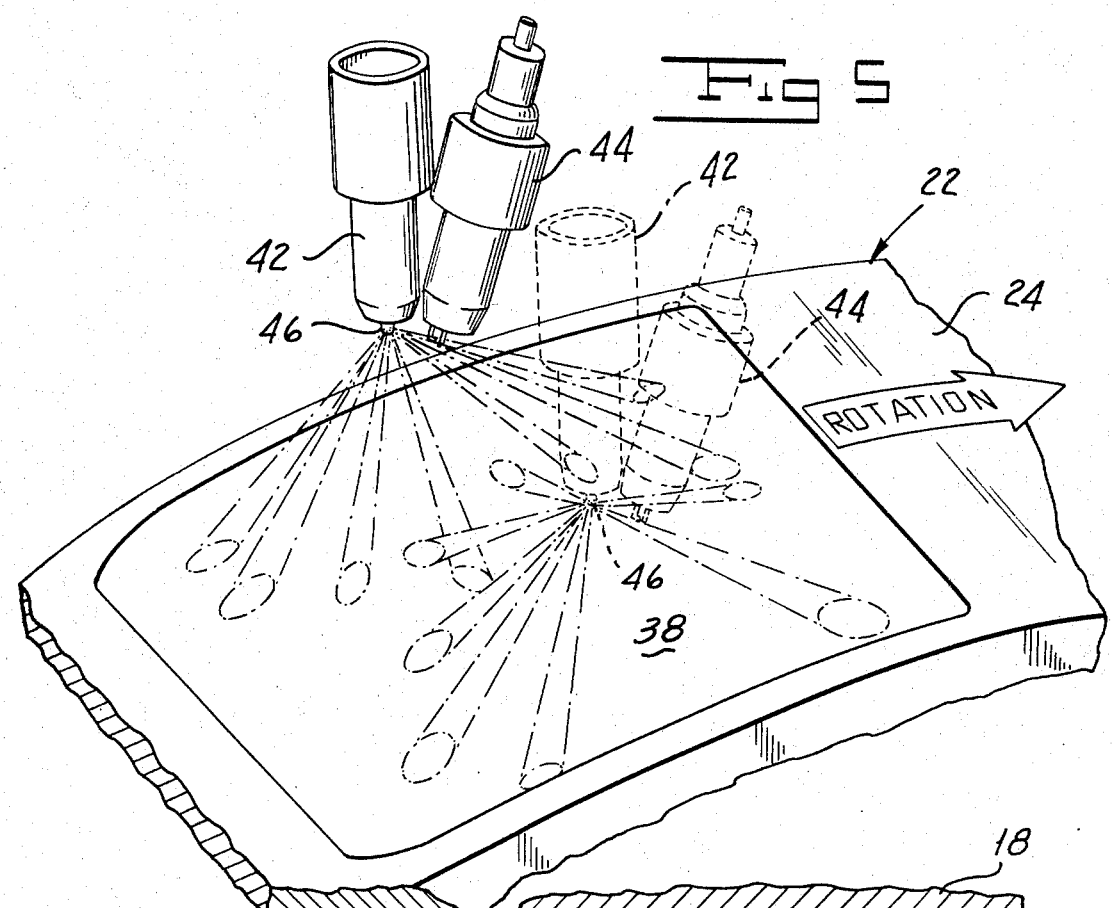
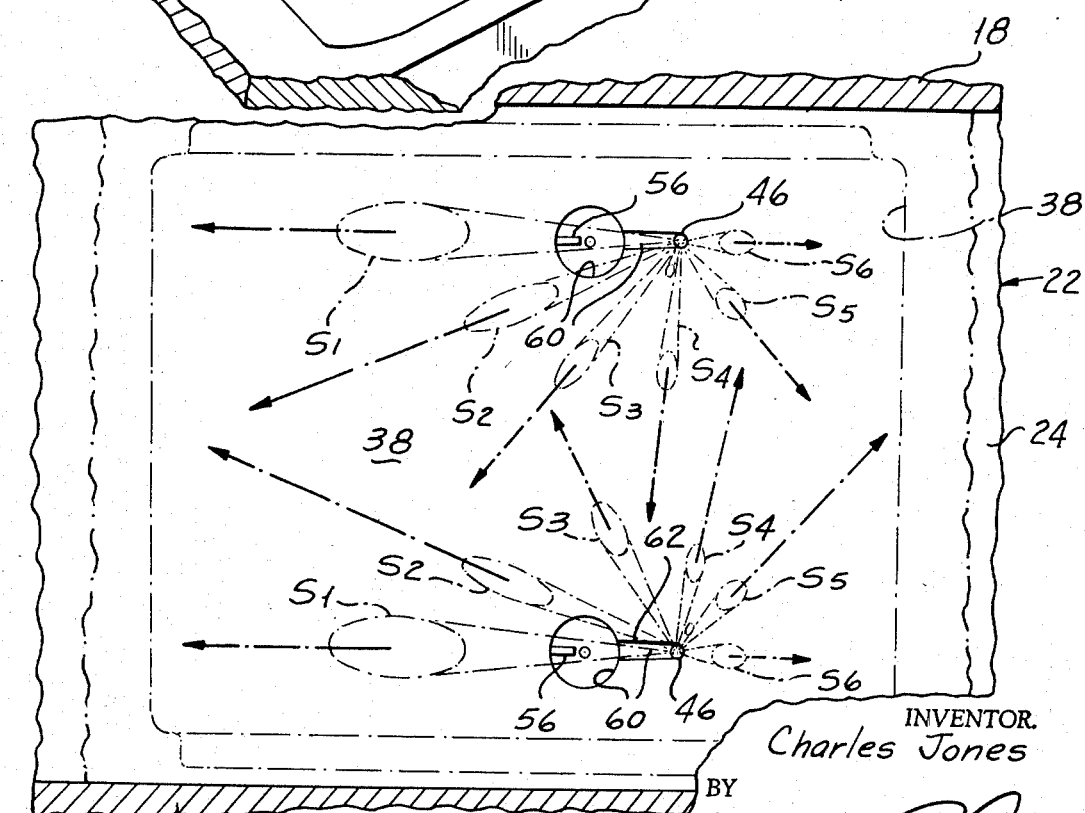

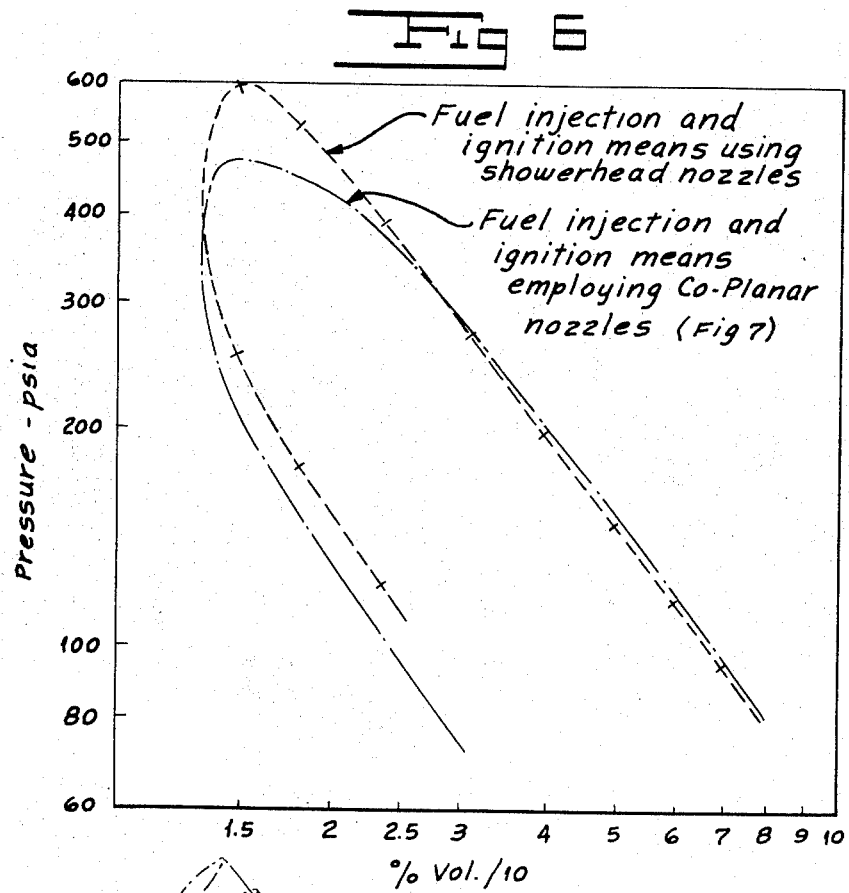
Fig 6
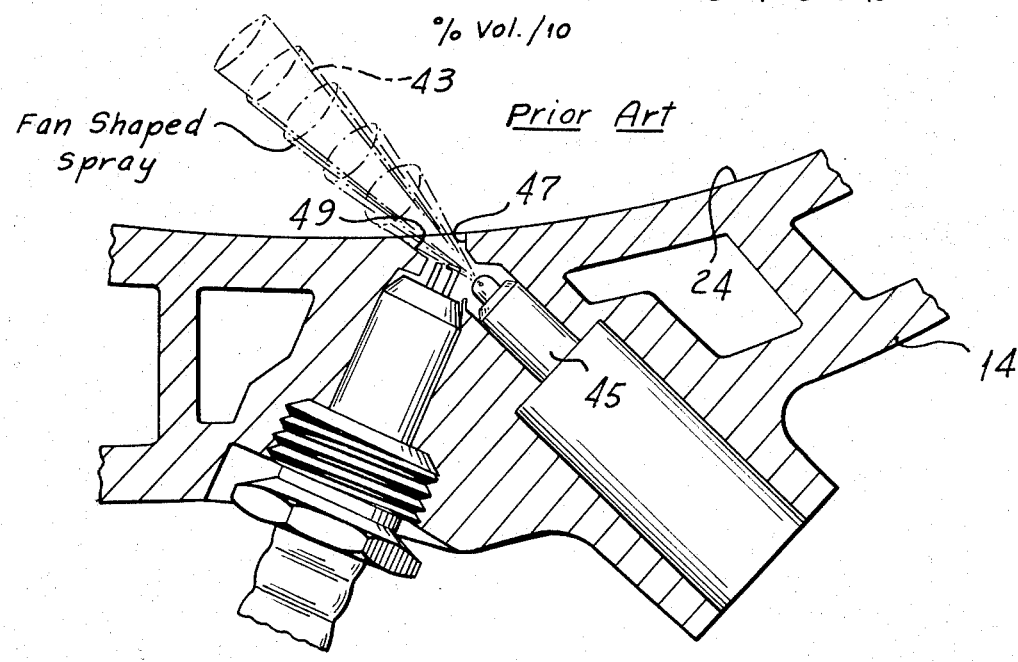
Fig 7 — Prior Art

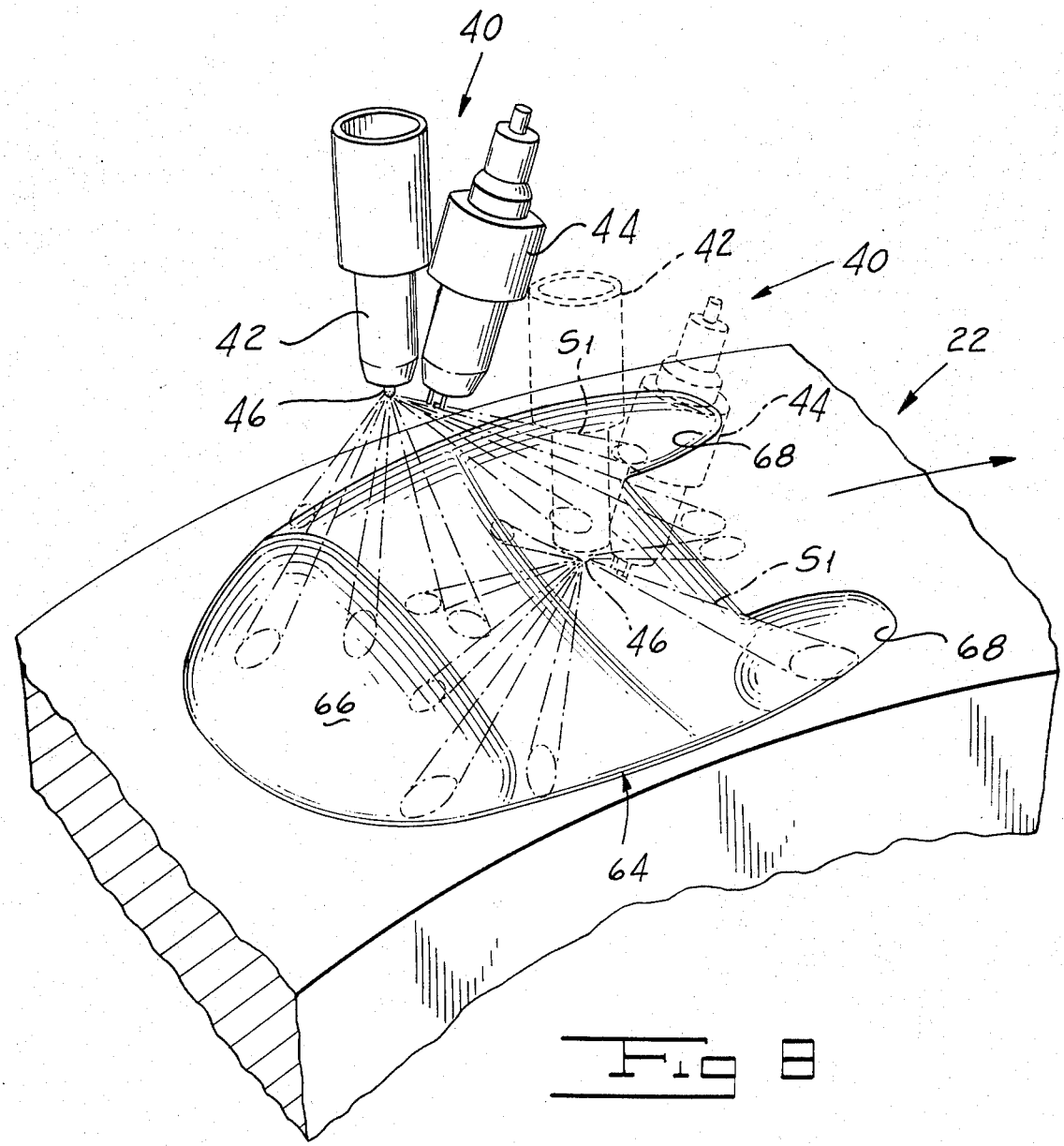

FUEL COMBUSTION SYSTEM FOR ROTARY PISTON INTERNAL COMBUSTION ENGINES

This invention relates to rotary piston, internal combustion engines of the type disclosed in the U.S. Pat. to Bentele, No. 3,359,956 and, more particularly, means for improving combustion in such engines.

BACKGROUND OF THE INVENTION

With the continued emphasis on the need for reducing atmospheric pollution, particularly from exhaust emissions emanating from internal combustion engines, it is increasingly important to improve fuel combustion in internal combustion engines of all types to minimize the amount of unburned hydrocarbons and other noxious matter in the exhaust gases. This aim of complete fuel combustion poses in rotary piston, internal combustion engines unique problems arising from the angular speed of the rotor and the size of the combustion chamber. It has been found that improved fuel combustion is achieved in rotary piston engines having unthrottled air intake, as exemplified in the U. S. Pat. to Bentele, No. 3,246,636 and Jones, No. 3,393,667, by a controlled injection of fuel adjacent an ignition device, such as a spark plug. This system has provided a controlled burning of fuel in a "stationary flame front" which effect is attributable to regulated turbulence in the injection nozzle-spark plug region. The system also permits combustion of a wide range of fuels, regardless of octane or cetane which are respectively important factors in Otto cycle type, spark ignition engines, and diesel-type compression ignition engines. This controlled injection type of combustion system is referred to as a "stratified charge" fuel system which provides a proper local stoichiometric mixture of air and fuel in spite of the presence of excess air within the working chamber. Obviously, in an engine having an unthrottled intake of air, the larger the volumetric size of the working chambers and/or the greater the speed of piston rotation, the more difficult is the problem of providing substantially complete combustion of fuel. In such "stratified charge" type combustion engines the power output of the engine is controlled, not by carburetion or by metering intake air but by regulating the injection of fuel into the working chambers. Thus, in working chambers of relatively large size, the fuel to air ratio (F/A) may become too lean to burn, particularly at light load — low speed operation. This inoperativeness is not overcome by increasing the duration of fuel injection because, while this increases the total fuel supplied, it does not increase the fuel to air ratio in the region of the ignition means. Also, prolonging fuel injection past top dead center, increases the amount of unburned hydrocarbons in the exhaust gases and does not result in a proportionate increase in output. Therefore, this proposed solution is undesirable. It is believed that shortening the duration of injection and increasing the flow rate to provide a richer fuel to air ratio in the region of the spark plug is not a solution because the desired mixing of air and fuel does not occur. One possible reason for failure to achieve proper stoichiometric mixing is the injection of fuel from nozzles in a co-planar spray pattern which, due to the speed of rotation of the rotor, does not allow sufficient time for the relatively narrow band of fuel spray to "wet" the air within the working chamber. Another reason is leakage of fluid past the rotor apex seal to the following intake working chamber resulting in a reduction in volumetric efficiency. Thus, high pressure fluid leakage around the apex seals occurs because to effect ignition of the fuel emitted from a co-planar injector nozzle by the associated ignition means, the nozzle must be substantially recessed from the trochoid surface of the rotor housing creating thereby a relatively large by-pass chamber. Even a widespread, co-planar fuel injection pattern does not permit the fuel to "find" the available air for proper stoichiometric mixing and also increases the size of the leakage or by-pass chamber. The use of dual pairs of fuel nozzles of the co-planar type and ignition means does not appreciably alter the aforementioned undesirable effect.

Accordingly, an object of the present invention is to provide for a rotary piston, internal combustion engine having an unthrottled air intake port, an improved fuel injection combustion system capable of providing a proper stoichiometric mixture of air and fuel through a wide load range.

Another object of this invention is to provide in a rotary piston, internal combustion engine having an unthrottled air intake port, an improved fuel combustion system, capable of maintaining a "stationary flame front" with a substantial amount of air in the working chamber in excess of that required for achieving a proper stoichiometric mixture of fuel and air.

A feature of the present invention is the use of dual fuel nozzle injectors in combination with an ignition means for each of the nozzle injectors, and wherein each fuel nozzle injector is constructed and arranged to provide for the emission of a plurality of fuel streams extending in different planes and directions into the working or combustion chamber.

SUMMARY OF THE INVENTION

The present invention, therefore, contemplates in a rotary piston internal combustion engine having an unthrottled air intake port for admitting combustion air into the working chambers of the engine, a fuel combustion system comprising two sets of fuel burning means, disposed in spaced relationship to each other in the engine housing along a line parallel to the axis of rotation of the rotary piston. EAch set of fuel burning means comprises a fuel ignition means and a fuel injector nozzle disposed adjacent to the ignition means so that the fuel is ignited as the fuel is injected. Each injector nozzle has a plurality of orifices arranged to emit a plurality of fuel streams extending in different planes and directions. Hereinafter, the injector nozzles, according to this invention, will be referred to as "showerhead" injector nozzles.

It has been found preferable to provide showerhead injector nozzles with orifices of different sizes arranged with the larger orifices positioned to direct at least one of the larger streams of fuel in the same general direction of rotation of the rotary piston and the other fuel streams toward the adjacent showerhead injector nozzle and ignition means. This pattern of fuel emission provides the requisite distribution of fuel within the working chambers for a stoichiometric mixture of fuel and air and thus, substantially reduce the amount of unburned hydrocarbons exhausted from the working chambers.

Also, it has been found preferable to dispose the ignition means, such as a spark plug, and the associated showerhead nozzles in close spaced relationship to the trochoid surface of the rotor housing and with their longitudinal axes of the nozzle extending substantially perpendicular to the trochoid surface. In this construction a small groove is provided in the trochoid surface extending between the nozzle and plug recesses so that one fuel stream ("light-off" stream) is brought in close proximity of the electrodes of the plug to be ignited thereby. This creates only a very small size cavity through which high pressure gases can leak past the apex seals and, therefore, leakage is minimal.

Particularly excellent fuel combustion results have been achieved when the dual showerhead injection nozzle and ignition means fuel combustion system has been combined with a rotor having pockets consisting of a relatively wide and deep recess and two laterally extending, relatively narrow, channels communicating with the recess and extending therefrom in the direction of rotor rotation, such novel rotor being fully disclosed in a U.S. patent application filed concurrently with this patent application and assigned to a common assignee. This novel combination comprises arranging each of the showerhead nozzles so that the "light-off" stream is directed into one of the narrow channels.

Of course, any suitable conventional means is provided for coordinating the pumping and release of the pressurized fuel through the showerhead injector nozzles with the energization of the ignition means and rotation of the rotary piston relative to the engine top dead center, such as disclosed in the U. S. Patent to Bentele, No. 3,246,636.

The above objectives and advantages of the present invention will appear more fully hereinafter from a consideration of the detailed description which follows when taken together with the accompanying drawings wherein one embodiment of the invention is illustrated.

BRIEF DESCRIPTION OF THE DRAWINGS

FIG. 1 is a cross-sectional view of a rotary piston, internal combustion engine having a fuel combustion system according to this invention;

FIG. 2 is a fragmentary plan view of the rotary piston, internal combustion engine of FIG. 1 on an enlarged scale showing the dual showerhead injection nozzle and spark plug fuel combustion system of this invention;

FIG. 3 is a fragmentary view, in cross section and on an enlarged scale, taken along line 3—3 of FIG. 2;

FIG. 4 is an enlarged fragmentary cross-sectional view taken along line 4—4 of FIG. 1 showing the trochoid surface of the engine housing and the pattern of the fuel spray emitted by the showerhead injector nozzles, the rotor recess being shown in phantom lines;

FIG. 5 is a schematic perspective view of the dual showerhead injector nozzles and spark plug arrangement according to this invention showing the fuel spray pattern relative to the rotor recess;

FIG. 6 is a graph comparing the curves plotted for the working chamber pressure relative to volume dual showerhead injection nozzle, spark plug fuel combustion system, and single showerhead injection nozzle-spark plug fuel combustion system.

FIG. 7 is a view similar to FIG. 3 showing the conventional fuel combustion system employing a co-planar fuel injection nozzle and spark plug; and FIG. 8 is a schematic view in perspective, similar to FIG. 5 showing the dual showerhead injection nozzle-spark plug fuel combustion system in combination with a rotor having a modified recess of unique configuration.

DESCRIPTION OF THE PREFERRED EMBODIMENTS

Now referring to the drawings and particularly FIGS. 1, 2 and 3 thereof, the reference number 10 generally designates a rotary piston, internal combustion engine of the type disclosed in the United States Patent to Felix Wankel et al. U.S. Pat. No. 2,988,065, which engine has a fuel combustion system according to this invention.

Briefly, rotary piston, internal combustion engine 10 comprises a housing consisting of a central portion 14 and two end walls 16 and 18 (only one of which is shown in FIG. 1) secured to central portion 14 by suitable means, such as tie bolts 20, to form therebetween a cavity in which a piston or rotor 22 is eccentrically mounted for rotation. The central portion 14 has an inner peripheral surface 24 having a double-epitrochoidal configuration, while the rotor 22 has a body portion with a plurality of contiguous peripheral arcuate surfaces 26. The surfaces 26 define with trochoid surface 24 and end walls 16 and 18 of the housing working chambers A, B and C which vary in volumetric size as rotor 22 rotates within the housing cavity. To seal the working chambers from each other at the trochoid surface 24 as rotor 22 rotates, seals 28 are carried in rotor 22, at the juncture of the adjacent arcuate surface 26, so as to abut trochoid surface 24. The interstices between the opposite end faces of rotor 22 and adjacent end walls 16 and 18 are sealed by seal strips 30 carried in the end faces so as to abut the adjacent end wall. The rotor 22 is connected to a drive shaft 32 to rotate the latter when the rotor rotates. An unthrottled air intake port 34 is provided in end wall 18 while exhaust port 36 is located in central portion 14. As is conventional in the art, each of the rotor surfaces 26 is provided with a recess 38. To effect combustion of fuel in the working chambers, a fuel burning system according to this invention, is provided.

The fuel burning system includes two sets of fuel injection-ignition means 40 each of which comprises a fuel injector nozzle 42 of the showerhead type and a spark plug 44. The sets of fuel injection-ignition means 40 are preferably arranged in central portion 14 of the housing in lateral spaced relation to each other on a line parallel to the axis of rotation of rotor 22, that is, across the width of the working chambers. Each of the showerhead nozzles 42 is of any suitable construction having a discharge tip 46 and a body portion 48 connected through a suitable coupling assembly 50 to a source of fuel, not shown. Each showerhead nozzle 42 is secured in a threaded counterbored portion 52 of a recess 54 in central portion 14 of the housing. In accordance with this invention, discharge tip 46 is provided with a plurality of orifices located to direct fuel streams in different directions and in different planes into the compression-working chambers as rotor 22 rotates. The fuel spray pattern of the showerhead nozzles 42 is to be distinguished from the co-planar, fan-like spray pattern 42 emitted from a conventional co-planar nozzle 45 shown in FIG. 7.

To obtain optimum fuel distribution within the compression-working chamber and achieve proper stoichiometric mixture with the air for maximum power and efficient combustion of fuel, the orifices in discharge tips 46 of each showerhead nozzle 42 are arranged, as best shown in FIGS. 3 and 4, to direct at least one stream $S_1$ within the working chamber in the direction of rotor rotation and at a very small acute angle with respect to the trochoid surface 24 (see FIG. 3). A plurality of other orifices are arranged to direct fuel streams $S_2$, $S_3$, $S_4$ and $S_5$, as best shown in FIGS. 4 and 5, into the rotor recess 38 and in the general direction of the adjacent showerhead nozzle 42. It has been found preferable to direct streams $S_2$, $S_3$, $S_4$ and $S_5$ from each showerhead nozzle 42 at angles with respect to the plane of trochoid surface 24 so that the "line of sight" of the streams intersect the rotor surface 26 at different points. It also has been found desirable to direct at least one stream, $S_6$, in a direction counter to the rotor direction of rotation or diametrically opposite stream $S_1$ but at a greater angle with respect to the plane of the trochoid surface than stream $S_1$. This fuel spray pattern provides for substantial "wetting" of the air trapped in the compression-working chamber.

It has been determined that showerhead nozzles have discharge tips 46 with orifices of a total area of 0.00036 square inches and wherein each orifice from which streams $S_1$, $S_3$, $S_4$, $S_5$ and $S_6$ emanate is of 0.006 inches in diameter while orifice for stream $S_2$ is of 0.007 inches in diameter, produced excellent high power specific fuel combustion in a 90 cubic inch displacement rotary combustion engine 10.

To ignite the fuel sprayed into the compression-working chamber from each showerhead nozzle 42, spark plug 44 is tightly turned into a threaded counter-bored portion 52 of a recess 56 in central housing portion 14 located adjacent the associate showerhead nozzle 42. The energization of spark plug 42 to cause an electric arc to jump the electrodes 58 and the injection of fuel are coordinated by means (not shown), such as disclosed in the U. S. Patent to Bentele, No. 3,246,636, so that as fuel is injected it is ignited. This controlled burning of fuel in a "stationary flame front" is conventionally referred to in the art as a "stratified charge" fuel system.

It is well known by those skilled in the art that, in a conventional stratified charge type fuel combustion system, such as illustrated in FIG. 7, some compressed gaseous fluid in the compression-working chamber leaks or escapes to the trailing compression-working chamber around the apex seals 38 (FIG. 1) as the latter pass over the openings 47 formed in the housing trochoid surface where the nozzle and spark plug cavity 49 is located. The amount of this leakage and, hence, the inefficiency of operation, is dependent upon the size of cavity 49. Accordingly, the present invention minimizes this leakage, by substantially reducing the size of the nozzle and spark plug cavity.

As is best illustrated in FIGS. 3 and 4, the use of showerhead type nozzles 42 has permitted the location of both the discharge tip 46 of the nozzle and the electrodes 58 of the associated spark plug 44 in very close proximity to the surface of trochoid surface 24. The location of the discharge tip 46 and electrodes 58 substantially at the trochoid surface provides a leakage cavity 60 of substantially smaller size than cavity 49 shown in FIG. 7. To bring a fuel stream in contact with the electric arc (not shown) jumping between spark plug electrodes 58, cavity 60 includes a relatively narrow and shallow groove 62 extending between the recesses 54 and 56. This groove 62 permits fuel stream $S_1$, hereinafter referred to as the "light-off" stream, to sweep past electrodes 58 and be ignited thereby.

The improved combustion which is achieved employing the two sets of fuel injection-ignition means 40, herein described, is illustrated in the graph shown in FIG. 6. This pressure-volume (PV) diagram depicts, in the curve shown by the doted line, that higher pressure is obtained in the working chamber of 90 cubic inch displacement with the fuel injection-ignition means 40 of this invention in engine 10 than is obtainable, as shown by the dot-dash line curve, by two sets of fuel injection-ignition means employing co-planar nozzles of the type shown in FIG. 7.

The rate and duration of fuel injection may be varied to provide the proper stoichiometric mixture of air and fuel as described in the U. S. Patent to Bentele, No. 3,246,636. The rate at which the fuel injection is varied is commensurate with the mass transfer past the nozzle and the instantaneous heat release which produce the best indicated horsepower. Fuel injection is of shorter duration for less than full load operation with the point of commencement of injection relative to top dead center remaining substantially constant but with termination of injection at a point closet to top dead center than at full load. For example, at high load operation, fuel injection may commence at about 50° before top dead center and terminate at about 10° after top dead center.

ALTERNATIVE EMBODIMENT

In FIG. 8 is shown another embodiment of the present invention in which the fuel injection-ignition means 40 is employed in a rotary combustion engine having a rotor with a unique pocket 64 (only one of which is shown) in the peripheral surfaces thereof. This novel rotor pocket 64 configuration is fully disclosed in a copending application concurrently filed with this application and assigned to a common assignee. The parts shown in FIG. 8 corresponding to like parts in FIG. 5 are identified by the same reference numbers.

As shown in FIG. 8, pocket 64 comprises a relatively deep and wide depression portion 66 which extends to a point in close spaced relationship with the opposite end faces of rotor 22 and two laterally spaced, relatively row and shallow channels 68, each channel communicating with depression portion 66 and extending therefrom in the direction of rotor rotation. In combination with the rotor having recesses or pockets 64 are injection-ignition means 40. Each showerhead nozzle 42 of fuel injection-ignition means 40 is positioned so that the light-off fuel stream $S_1$, at the initiation of fuel emission, is directed into one of the channels 68. This combination of fuel injection-ignition means 40 and rotor pocket 64 produces a coaction of fuel pattern with a chamber configuration which achieves improved fuel distribution, superior fuel and air mixing and, hence, burning than is achieved in working chambers defined by rotors of the type shown in FIG. 5.

It is now believed readily apparent that the present invention provides a fuel combustion system for more efficient combustion of fuel in a rotary piston, internal combustion engine having an unthrottled air intake port for admitting air into the working chambers of the engine. It is a fuel combustion system which provides for intimate mixing of fuel and air, particularly in engines having relatively wide working chambers.

Although two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A rotary piston, internal combustion engine comprising a housing having an inner peripheral surface and end walls defining a cavity and a rotor supported for rotation within the cavity and defining with the housing a plurality of working chambers which successively expand and contract in volumetric size as the rotor rotates, the housing being provided with an inlet port and an exhaust port for respectively passing air into the working chambers and gaseous combustion products from the working chambers, in combination with a fuel combustion system comprising:
    a. two sets of fuel injection-ignition means, spaced along a line substantially parallel to the rotor axis of rotation;
    b. each set comprising a fuel injector nozzle and an ignition means each of which is secured in close spaced relationship to each other in a recess in the housing which recesses communicate through the inner peripheral surface of the housing with the working chambers;
    c. each fuel nozzle being connected to a source of fuel and having a discharge tip portion with a plurality of spaced orifices therein from which fuel is emitted into the working chambers in different directions and planes;
    d. each ignition means has an igniter end portion positioned to effect burning of said fuel in said streams;
    e. each of said fuel nozzles and ignition means being disposed in their respective recesses so that their discharge tip portions and their igniter end portions are substantially at the inner peripheral surface of the housing and yet out of the line of travel of said rotor;
    f. the fuel injector nozzles of said sets of fuel injection-ignition means being disposed so that at least one fuel stream extends substantially in the direction of rotor rotation and in close proximity to the igniter end portion of the associated ignition means to be ignited thereby and the other streams project generally toward the opposite fuel injector nozzle.

2. The combination of claim 1 wherein a groove is formed in the inner peripheral surface of the housing to extend between each of the recesses for the fuel injector nozzles and its associated ignition means so as to receive at least part of said one fuel stream and thereby facilitate ignition of said one fuel stream.

3. The combination of claim 1 wherein said rotor comprises:
    1. a body portion having a plurality of contiguous peripheral surfaces;
    2. a pocket in each of said peripheral surfaces;
    3. each of said pockets consisting of a relatively wide and deep depression and two spaced relatively narrow and shallow channels communicating with the depression and extending in the direction of rotor rotation to a point spaced from the leading portion of the associated surface; and
    4. said channels being dimensioned and disposed relative to said fuel injector nozzles so that said one fuel stream from each of said fuel injector nozzles projects into a channel when fuel injection is initiated.

4. The combination of claim 1 wherein said ignition means is a spark plug and the igniter end portion is spaced electrodes across which an electrical charge jumps.

5. The combination of claim 1 wherein said air inlet port is unthrottled.

6. The combination of claim 1 wherein said ignition means for each set of fuel injection-ignition means is disposed forwardly of the fuel injector nozzle with respect to the rotor direction of rotation.

7. The combination of claim 1 wherein each set of fuel injection-ignition means are disposed in close spaced relationship to the housing end walls of the engine.

8. The combination of claim 1 wherein said working chambers are of 90 cubic inch displacement and wherein each of the discharge tips is provided with six orifices of a total flow area of 0.00036 square inches.

9. The combination of claim 8 wherein five of the six orifices are of 0.006 inches in diameter and one is 0.007 inches in diameter.

10. The combination of claim 1 wherein said engine working chambers are of 90 cubic inch displacement and wherein each of the discharge tips is provided with six orifices of a total flow area of 0.00036 square inches.

* * * * *